July 16, 1957 — H. LINDARS — 2,799,811
TIME CONTROL APPARATUS
Filed Feb. 20, 1951 — 5 Sheets-Sheet 1

Inventor
Herman Lindars
by Peck & Peck
Attorneys

FIG. 4.

United States Patent Office 2,799,811
Patented July 16, 1957

2,799,811
TIME CONTROL APPARATUS
Herman Lindars, Sheffield, England
Application February 20, 1951, Serial No. 211,832
Claims priority, application Great Britain
February 27, 1950
3 Claims. (Cl. 317—141)

This invention relates to time control apparatus, and has for an object to provide simple and readily adjustable means for controlling the duration of one or more events in an industrial process or the like.

One object of the present invention is to provide timing apparatus wherein successive predetermined periods of time are defined by successive reversals of a constant speed motor, and preselected reversals are utilised to effect an external control operation.

Another object is to provide a timing apparatus in which the intervals between certain reversals are variable at will according to the particular requirements of a process being controlled.

A further object is to provide control apparatus whereby a complete program of control operations can be automatically carried out.

A still further object of the invention resides in the provision of a control apparatus whereby a number of successive operations may be carried out in a predetermined sequence and at preselected intervals of time, including "dwell" periods during which no control operation takes place, said control operations being represented by corrresponding contacts on one or more levels of a uniselector relay operated by reversals of the constant speed motor.

Various embodiments of the invention will now be described by way of example only with reference to the accompanying drawings in which.

Figures 1, 2:
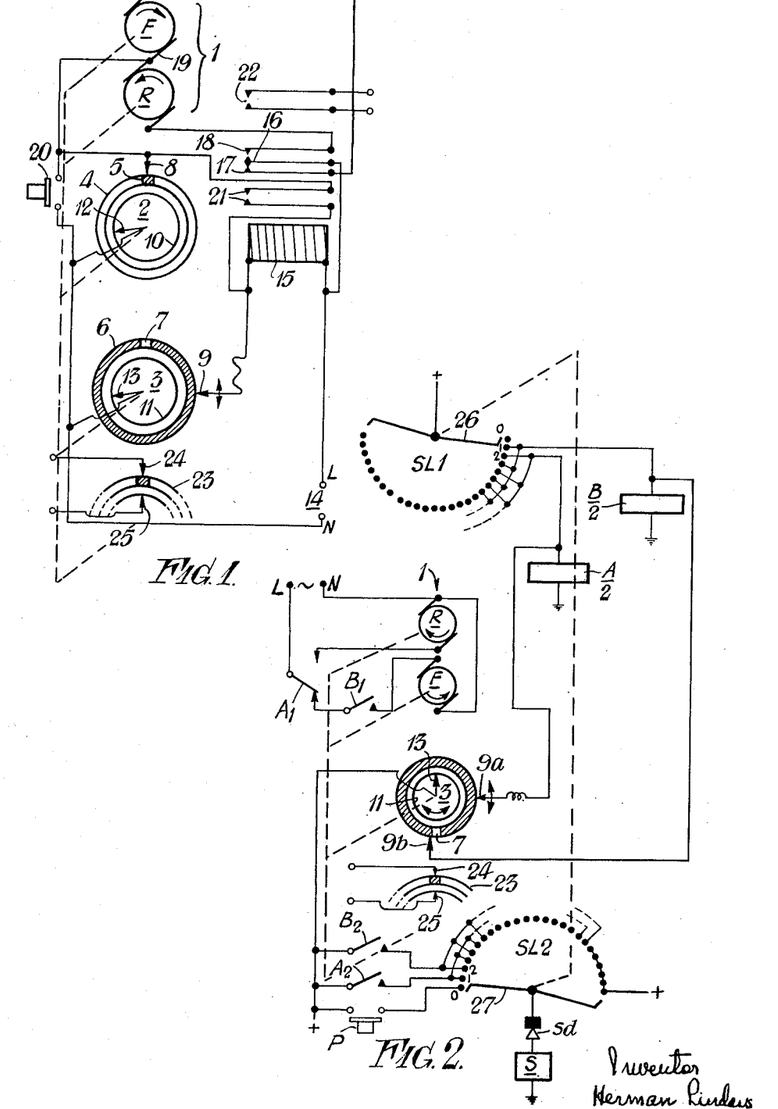
Fig. 1 is a simple form of timing device for controlling a single event.
Fig. 2 is a circuit diagram of an alternative arrangement.

Referring first to Fig. 1 of the drawings, an alternating current reversible synchronous motor 1 is shown schematically as having two rotors, F, R, for forward and reverse rotation respectively. The motor drives a shaft (not shown) carrying a pair of rotary contact discs 2, 3 respectively, the periphery of the disc 2 carrying or constituting an annular contact 4 having a short insulating segment 5 at one point, whilst the other disc 3 has an insulating periphery 6 which is interrupted at the corresponding point by a short conducting segment 7. A respective brush 8, 9 co-operates with the periphery of each disc 2, 3 and the conducting portions 4, 7 respectively of the two peripheries are connected together through inner rings 10, 11 and coacting brushes 12, 13 respectively and to one pole—say, the neutral N—of the alternating current supply 14. The brush 8 which engages the substantially conducting periphery 4 of the first disc 2 is fixed, whilst the brush 9 which engages the substantially insulating periphery 6 of the second disc 3 is adjustable through an angle of nearly 360°.

An electro-magnetic relay 15 has one end of its winding connected to one—say, the line—pole L of the alternating current supply 14 and to the moving blade 16 of a set of change-over contacts 16, 17, 18 the co-operating blades 17, 18 of which are connected respectively to the forward and reverse rotors F, R of the motor 1. The said rotors have their one sides commoned at 19 and connected to the fixed brush 8 which co-operates with the first disc 2, and to the one side of a starting switch 20 which is preferably constituted by a push button. The other side of the push button is connected to the neutral pole N of the alternating current supply 14 to which also the conducting segments 4, 7 of the two discs 2, 3 are connected. The other end of the relay winding 15 is connected to the adjustable brush 9 which co-operates with the second disc 3, and to one of a pair of normally open hold-on contacts 21, the co-operating contact of which is connected to the common sides of the forward and reverse rotors F, R.

In the operation of this device, the zero or rest position of the motor 1 is that in which the insulating segment 5 in the conducting periphery of the first disc 2 lies beneath the fixed contact brush 8. The conducting segment 7 of the insulating periphery of the second disc 3 is then also in the zero position, the relay 15 is de-energised, and the hold-on contacts 21 are open, while the changeover contacts 16, 17, 18 are in the position to connect the forward rotor F of the synchronous motor 1 to A. C. line L.

When the start button 20 is depressed, the circuit through the forward rotor F is completed to A. C. neutral N, and the motor 1 commences to run at synchronous speed in the forward direction. The two discs 2, 3 are thereupon rotated and the insulating segment 5 on the first disc moves away from the fixed brush 8 to complete the circuit from the commoned sides 19 of the forward and reverse rotors F, R through the conducting periphery 4 of the disc 2 to neutral N, thereby short-circuiting the contacts of the start switch 20. The latter can then be released and the motor 1 continues to run in the forward direction until the conducting segment 7 on the second disc 3 is brought beneath the adjustable contact brush 9. At this instant, the electro-magnetic relay 15 is energised to operate the change-over contacts 16, 17, 18 which reverse the synchronous motor 1. Simultaneously, the hold-on contacts 21 are energised to connect the other end of the relay winding to A. C. neutral N through the fixed brush 8 and first contact disc 2.

As soon as the motor 1 begins its reverse rotation, the circuit through the conducting segment 7 on the second disc 3 and the adjustable brush 9 is broken, but the relay 15 remains energised so long as the fixed brush 8 is in contact with the conducting periphery 4 of the first disc 2.

As soon as the insulating portion 5 of the periphery of the first disc 2 is brought back to the zero position beneath the fixed contact brush 8, the circuit to the electro-magnetic relay 15 through its hold-on contacts 21 is broken and the relay releases. The reverse rotor R of the motor 1 is thereupon de-energized by the change-over contacts 16, 18 of the relay. While the circuit to the forward rotor F is broken at the start button 20 and at the first contact disc 2. The motor 1 thereupon comes to rest and is ready for a subsequent cycle of operations on depression of the start button 20.

The period of forward rotation of the motor 1 is de-determined by the position of adjustment of the brush 9, as will be understood, and, assuming that the motor runs at the same speed in both directions, this period is one half of the total time of one cycle of forward and reverse running of the motor. The external circuit to the device controlling the event or process to be timed may be energised by means of contacts 22 operated by the electro-magnetic relay 15, in which case the device controlling the timed event is energised for one half of the cycle of the control mechanism, and de-energised for the other half. Alternatively, the controlled device may be connected between the brush 8 and pole L of the A. C. supply 14. The device is then operated for the full period of forward and reverse rotation of the motor 1.

In a further alternative arrangement, the said device may be energised through a third contact disc 23 carried on the driven shaft, and arranged similarly to the first contact disc 2 so that a pair of brushes 24, 25, co-operating therewith complete the circuit to the controlled device throughout the complete cycle of operation of the motor.

In a second form of the invention illustrated in Fig. 2, the synchronous motor 1 drives only a single disc 3 corresponding to the second disc in Fig. 1, i. e., the great part of its periphery is non-conducting but is interrupted at one point by a short conducting segment 7. This segment 7 is connected through the ring 11 and brush 13 to the positive pole of a direct current supply. A pair of brushes 9a, 9b make contact with the periphery of this disc, the brush 9b being fixed at the zero position whilst the other brush 9a is adjustable according to the required period of operation.

The forward and reverse rotors F, R of the synchronous motor 1 have their one sides commoned and connected to the neutral N of the A. C. supply. The other sides of the rotors are connected through change-over contacts A, operated by a relay A/2 to A. C. line L. The forward rotor F only is also connected in series with the normally open contacts B1 of a second relay B/2. The first relay A/2 has one end of its winding earthed whilst the other end is connected to the adjustable brush 9a and also to the even-numbered contacts on the first level SL1 of a two-level rotary selector switch S of the type commonly referred to in telephone practice as a uniselector. The wiper 26 of this level SL1 is connected to the D. C. positive pole. The second electro-magnetic relay B/2 has one end of its winding earthed whilst the other end is connected to the fixed brush 9b and also to the odd-numbered contacts on the first level SL1 of the said uniselector switch S.

Each relay A/2, B/2 controls a second pair of contacts A2, B2 respectively which are normally open and serve to connect the D. C. positive main to alternate contacts on the second level SL2 of the uniselector switch S, the odd-numbered contacts on this level being energised by operation of the first relay A/2 and the even-numbered contacts by the second relay B/2. The wiper 27 of the second level SL2 is connected through the self-drive contacts sd and the winding of the driving magnet S of the uniselector to earth.

In the operation of this form of the invention the wipers 26, 27 are first moved from the zero to the first contacts of the respective levels. This movement can conveniently be effected by means of a start push button P connected between the positive main and the zero contact on the second level SL2. As soon as the wiper 26 makes contact with the first contact of the first level SL1, the second relay B/2 closes the normally open contacts B1 in series with the forward rotor F of the synchronous motor 1. The motor thereupon commences to run in the forward direction until the conducting segment 7 on the periphery of the disc 3 makes contact with the adjustable brush 9a. At this point the first relay A/2 is energised to operate the change-over contacts A1 in the synchronous motor circuit, thereby effecting reversal of the motor and at the same time closing the normally open contacts A2 in series with the first contact on the second level SL2 on which the wiper 27 is then standing. The driving magnet S is thereupon energised to step the uniselector round one position so that the positive main is then connected through the second contact on the first level SL1 to the winding of the first relay A/2, thus locking in this relay. As soon as the synchronous motor 1 begins its reverse rotation, the conducting segment 7 is moved away from the adjustable brush 9a and the motor continues to run by virtue of the fact that the first relay A/2 is held in by the uniselector switch on the first level SL1.

When the conducting segment 7 reaches the fixed brush 9b at the zero position, the second relay B/2 is re-energized to close the normally open contacts B2 in series with the second contact of the second level SL2 and the driving magnet S is again energized to step the uniselector round to the next contact. This operation breaks the hold-on circuit through the second contact on the first level SL1 to the first relay A/2 which is thus de-energised and releases the change-over contact A1 to restore the circuit to the forward rotor F of the motor. At the same time, a hold-on circuit is established for the second relay B/2. The normally open contacts B1 in series with the forward rotor have also been closed by operation of the second relay B/2 so that the motor again reverses and commences to run in the forward direction until the conducting segment 7 moves away from the fixed brush 9b. The sequences of operation may be repeated for any number of times according to the particular circumstances in which the apparatus is to be used. In order to ensure that the timer returns to its zero position after the final timing operation has been completed, all the contacts on the second level SL2 after the last add-numbered contact connected to the relay contacts A2 are strapped together and connected to the positive main. Thus, when the segment 7 makes contact for the last time in a sequence, the relay A/2 is energised to step the uniselector round one step and bring the wiper 27 onto the remaining strapped contacts, and the driving magnet "homes" the wipers 26, 27 to their zero positions.

As will be seen, the period during which the motor runs first in the forward and then in the reverse direction in each cycle is determined by adjustment of the adjustable brush 9a around the periphery of the disc 3, and the device thus constitutes a time control apparatus, which may control external equipment either through contacts on a third level SL3 of the uniselector switch or through contacts 24, 25 operated by a further disc 23 driven by the motor 1, as will be understood.

Figure 3:
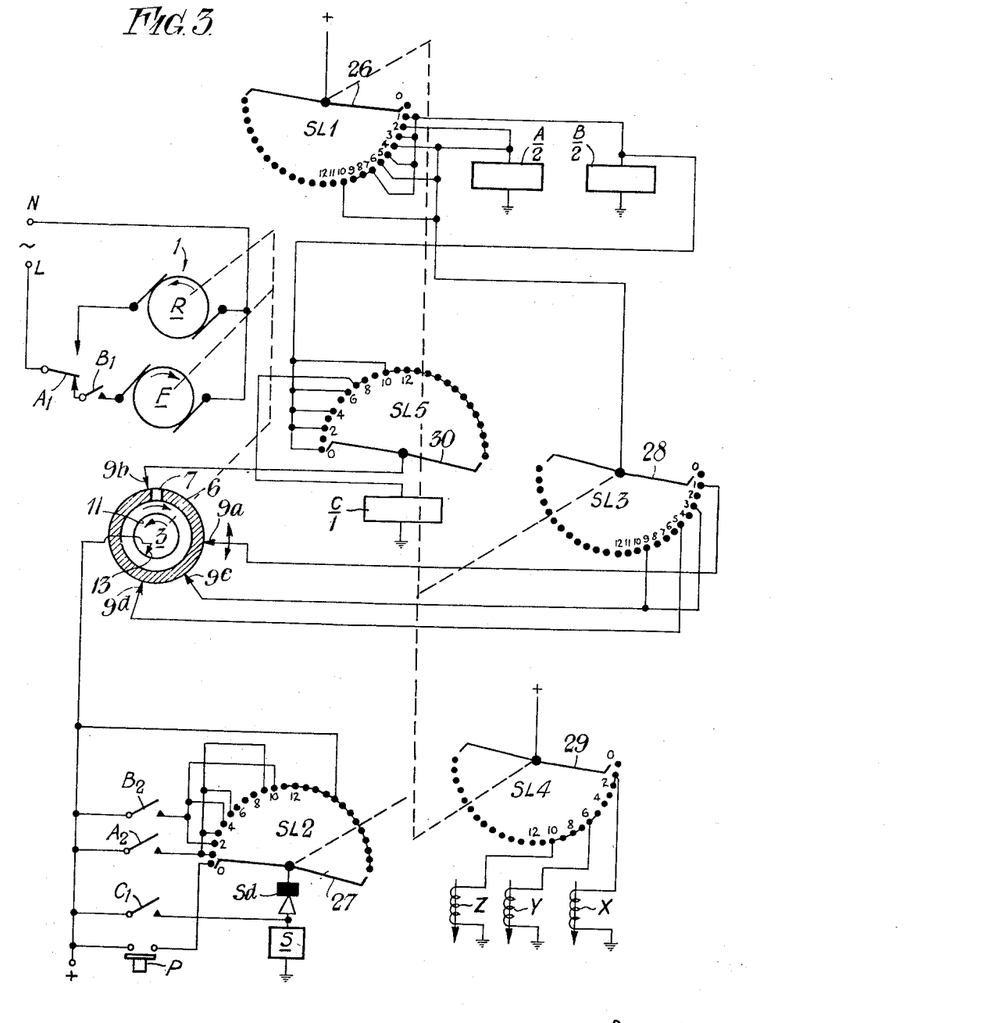
Fig. 3 is a more elaborate form of the invention permitting a number of variations of timing period to be made and a larger number of operations to be controlled.

In the embodiment of the invention shown in Fig. 3, the reversible motor 1 drives a single disc 3 having the greater part of its periphery of insulating material 6 interrupted at the zero position by a conducting segment 7. In this case, however, there are a number of brushes 9a, 9b, 9c, 9d co-operating with the disc 3, some or all of which brushes may be adjustable in position according to requirements. Associated with the reversible motor 1 and disc 3 are first and second electro-magnetic relays A/2, B/2 as in the previous embodiment, together with a five-level uniselector switch S and a third electro-magnetic relay C/1. The contacts of the first level SL1 are connected as required to the first or second electro-magnetic relay A/2, B/2 whereby these relays are energised in accordance with the successive positions of the uniselector during operation of a sequence of complete cycles of the reversible motor. Some of the contacts of the second level SL2 are connected through normally open contacts A2, B2 to the D. C. positive main the odd-numbered contacts on the second level SL2 being energised by the normally open contacts A2 and even-numbered contacts by the contacts B2. The wiper 27 of the second level SL2 is connected in series with the self-drive contacts sd and the driving magnet S of the uniselector. Selected contacts on the third level SL3 of the uniselector are connected to the brushes 9a, 9c, 9d which co-operate with the disc 3, the positions of these contacts being chosen in accordance with a pre-arranged programme of events which it is desired that the timing apparatus should control. The wiper 28 of this level is connected to those contacts on the first level SL1 to which the winding of the first electromagetic relay A/2 is connected. The contacts of the fourth level SL4 of the uniselector are connected to the energising elements X, Y, Z (e. g. solenoids) of the several pieces of apparatus which control the operation of the events to be controlled by the apparatus. Some of the contacts may be strapped together in accordance with the particular requirements of any given programme of events. The wiper 29 on the fourth level is connected directly to the D. C. positive main, and the other ends of the said energising elements X, Y, Z being earthed.

The contacts on the fifth level SL5 of the uniselector which correspond to those contacts of the first level SL1 which are connected to the first electro-magnetic relay A/2 are connected to the winding of the second electromagnetic relay B/2, whilst one of the contacts on the fifth level SL5 which corresponds to one of the contacts on the first level SL1 connected to the second electromagnetic relay B/2 is connected to the third electromagnetic relay C/1 having one pair of normally open contacts $C_1$ connected in circuit between the live side of the uniselector driving magnet winding S and the D. C. positive main. The wiper 30 on the fifth level is connected in series with the fixed brush 9b co-operating with the motor-driven disc 3. A start button P is connected in series between the positive main and the zero contact on the second level SL2 whose wiper 27 energises the uniselector driving magnet 3.

The apparatus operates as follows. In the initial position, the motor 1 is at rest with the conducting segment 7 on the disc 3 in its zero position and the uniselector wipers 26 . . . 30 standing on the zero contacts. When the start button P is pressed to close its contacts, the positive main is connected through the zero contact on the second uniselector level SL2 and its co-operating wiper 27 to the driving magnet S, and the wipers are stepped round one position, thus breaking the circuit through the start button P. The latter can then be released. The wiper 26 on the first level SL1 makes the circuit through the second relay B/2 which thereupon closes the normally open contacts $B_1$ in circuit with the forward rotor F of the synchronous motor 1 which is then energised both through these contacts and through the corresponding pair of change-over contacts $A_1$ controlled by the first relay A/2.

The motor 1 thereupon commences to run in the forward direction until the conducting segment 7 on the disc 3 reaches the brush which is connected to the first contact on the third level SL3 of the uniselecor—in the circuit shown, the brush 9a. This makes the circuit from the positive main through the third level wiper 28 to the first relay A/2 which is thereupon energised to reverse the connections at the change-over contacts $A_1$ in the motor circuit, thus opening the circuit to the forward rotor F and closing that to the reverse rotor R. The motor 1 thereupon reverses and continues to run in the opposite direction until the conducting segment 7 reaches the brush 9b at the zero position.

Simultaneously, with the changing over of the motor connections to effect reveral thereof, the normally open contacts $A_2$ which are in circuit with certain of the contacts on the second level SL2 are closed, thus connecting the positive main through the first contact on this level and its wiper 27 to the driving magnet S of the uniselector. The uniselector is thereupon stepped round so that the wiper 26 on the first level SL1 reaches the second contact which is also connected to the winding of the first relay A/2. This latter circuit acts as a hold-on circuit for the relay so that it remains energised during the period of reverse rotation of the motor.

Simultaneously with the first step of the uniselector, which is effected by closure of the start button P, the wiper 29 on the fourth level SL4 engages the first contact and connects the positive main to the energising element X of the first controlled apparatus. This contact on the fourth level is strapped to the second contact so that as soon as the uniselector makes its second advance, this controlled apparatus remains energised for the period during which the motor is running in reverse.

When the uniselector has made its second step, the wiper 30 on the fifth level SL5 completes a circuit from the zero brush 9b to the second relay B/2, so that when the conducting segment 7 on the disc 3 reaches the zero brush 9b, the positive main is connected through the fifth level of the uniselector to energize the second relay B/2. This relay then closes the contacts $B_2$ so that the uniselector driving magnet S is again energised, through the second contact on the level SL2 and the wiper 27, to advance the uniselector. This advance breaks the hold-on circuit to the first relay A/2 on the first level SL1, and the change-over contacts $A_1$ controlled thereby revert to their normal position in series with the forward rotor F of the motor. The contacts $B_1$ have already been closed by the second relay B/2, and the motor 1 starts running again in the forward direction.

At the same time, the wiper 29 on the fourth level SL4 is advanced to the third contact which may be connected to another controlled apparatus, or, as shown, may be on open circuit. The first controlled apparatus is thus released and either another apparatus is energised or, in the circuit shown, a dwell period is initiated during which no controlled apparatus is energised. It will be understood that the arrangement of the connections to the contacts on the fourth level SL4 will depend upon the particular details of the sequence of events or processes required to be controlled on a time basis.

The motor 1 continues to run in the forward direction until the conducting segment 7 makes contact with a brush which is connected to the third contact of the third level SL3 of the uniselector—in the present case, this is the brush 9c—whereupon the first relay A/2 is re-energised to effect both reversal of the motor 1 and also a further stepping round of the uniselector through the contact with which the second level wiper 27 is then engaged. The uniselector is then advanced so that a hold-on circuit for the first relay A/2 is completed on the first level SL1. This brings the wiper 29 on the fourth level SL4 into engagement with a further open-circuit contact, so that no further controlled apparatus is energised at this step.

When the uniselector wipers 26 . . . 30 reach their respective contacts No. 7, and the motor 1 starts to run once more in a forward direction, it will be noted that none of the brushes 9a . . . 9d is connected to the said contact No. 7 on the level SL3, and therefore, the uniselector will not be moved forward one step until the conducting segment 7 comes into contact with the zero brush 9b, i. e. when the disc 3 has made one complete revolution. When this occurs, the relay C/1 is impulsed through the wiper 30 and contact No. 7 on the level SL5, thereby momentarily closing the contacts $C_1$ so long as the conducting segment 7 is passing beneath the zero brush 9b. This impulsing of the relay C/1 causes the uniselector wipers 26 . . . 30 to move round one step to contact No. 8. The second relay B/2 remains energised through this contact on the second level SL2 whilst the first relay A/2 remains de-energised, so that the motor 1 will continue to run in the forward direction until, by a repetition of the above cycle of events, the uniselector wipers 26 . . . 30 reach their respective contacts No. 9. When, now, the segment 7 reaches the brush 9c the relay A/2 is energised through the wiper 28 of level SL3 and the motor 1 is reversed. At the same time, the wipers are stepped round to the next contact due to energisation of the magnet S through the contact No. 9 and wiper 27 on the level SL2, thus holding in the relay A/2 through the contact No. 10 and wiper 26 on the level SL1.

The above cycle of operations is repeated indefinitely until the wiper 27 on the second level SL2 reaches a contact (No. 11 in the circuit shown) which is permanently connected to the positive main. This contact is strapped to all other remaining contacts on the level so that the uniselector is driven, through its self-drive contacts *sd* back to the zero position in which all circuits are broken except that through the zero contact on the second level SL2 which is connected to the start button P. The cycle of operations is then recommenced as soon as the start button is pressed.

It will thus be seen that the uniselector S provides a convenient device for controlling a number of different events or processes according to a desired programme, the duration of these events or processes, and of any dwell periods between successive events in a sequence, being pre-selected by the connections to the contacts on the various levels which control the energisation of the electro-magnetic relays A/2, B/2 and also select which of the brushes 9a . . . 9d is to be rendered operative to energize the first relay A/2. This latter provision enables variable time limits to be pre-set according to the nature of the event in the sequence.

Figure 4:
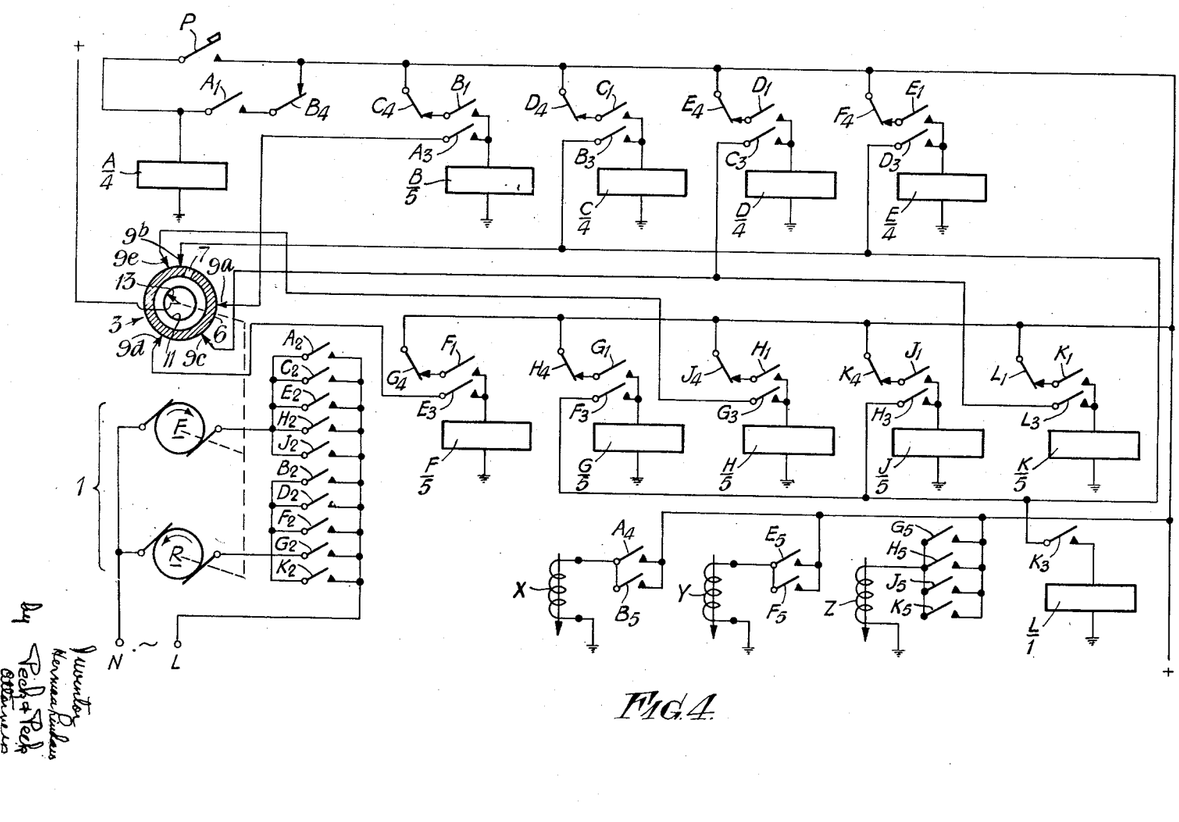
Fig. 4 is a circuit arrangement in which uniselectors such as those shown in Figs. 2 and 3 are replaced by sequentially energised electromagnetic relays.

In place of the uniselectors of Figs. 2 and 3, sequentially energised electro-magnetic relays may be provided for controlling the sequence and durations of the several events, as shown, for example, in Fig. 4. In this embodiment of the invention, a first relay A/4 is energised on closure of the starting switch or button P and is locked in by its hold-on contacts A₁. The relay A/4 energises the forward rotor F of the reversible synchronous motor 1 through its contacts A₂ and, through the contacts A₃, connects the adjustable brush 9a which engages the mainly insulating periphery 6 of the motor driven disc 3 to the winding of the second relay B/5. Simultaneously, the contacts A, energize a controlled solenoid X. Energization of the relay B/5 through the conducting segment 7 on the disc 3 when it reaches the said brush 9a causes the first relay A/4 to be de-energised by opening the contacts B₄, reverses the synchronous motor 1 by closing the contacts B₂ (the contacts A₂ are now open) and connects the zero brush 9b to the third relay C/4. Closure of the contacts B₅ maintains the solenoid X energised after the contacts A₄ are opened.

Energisation of the relay C/4 cancels the circuit to the second relay B/5 by opening the contacts C₄, effects another reversal of the motor 1 by closing the contacts C₂ in series with the forward rotor F, and connects the brush 9c to the fourth relay D/4. Opening of the contacts B₅ on de-energisation of the relay B/5 de-energises the solenoid X, but since there are no contacts on the C/4 relay for controlling an event, a dwell period now commences.

This dwell period is made up first of the time required for the segment 7 on the disc 3 to travel from the zero brush 9b to the brush 9c, whereupon the relay D/4 is energised, and secondly—since this relay also has no event-controlling contacts—the time required for the segment 7 to return to the zero brush 9b. Clearly, of course, each relay C/4, D/4 could, if preferred, be provided with additional contacts for controlling one or more events.

It will be seen from an inspection of the circuit that the following programme will be carried out by the apparatus shown in the figure:

| Event | Duration (travel of segment 7) | Relay energised |
|---|---|---|
| Y | zero to brush 9d—forward | E/5 |
|   | brush 9d to zero—reverse | F/5 |
|   | zero to brush 9e—reverse | G/5 |
| Z | brush 9e to zero—forward | H/5 |
|   | zero to brush 9c—forward | J/5 |
|   | brush 9c to zero—reverse | K/5 |

When the segment 7 on the disc 3 reaches the zero brush 9b on this last travel, the relay L/1 is energised through contacts K₃, and the opening of the contacts L₁ releases the relay K/5 to terminate the event Z by opening the contacts K₅. At the same time, the reverse rotation contacts K₂ are opened and the motor 1 stops. The apparatus is thus reset for the initiation of the reset programme by closing the switch or button P.

It will be understoood that the number and arrangement of the discs in the timing unit, and of the brushes co-operating therewith, may be varied to suit particular circumstances.

Figure 5:
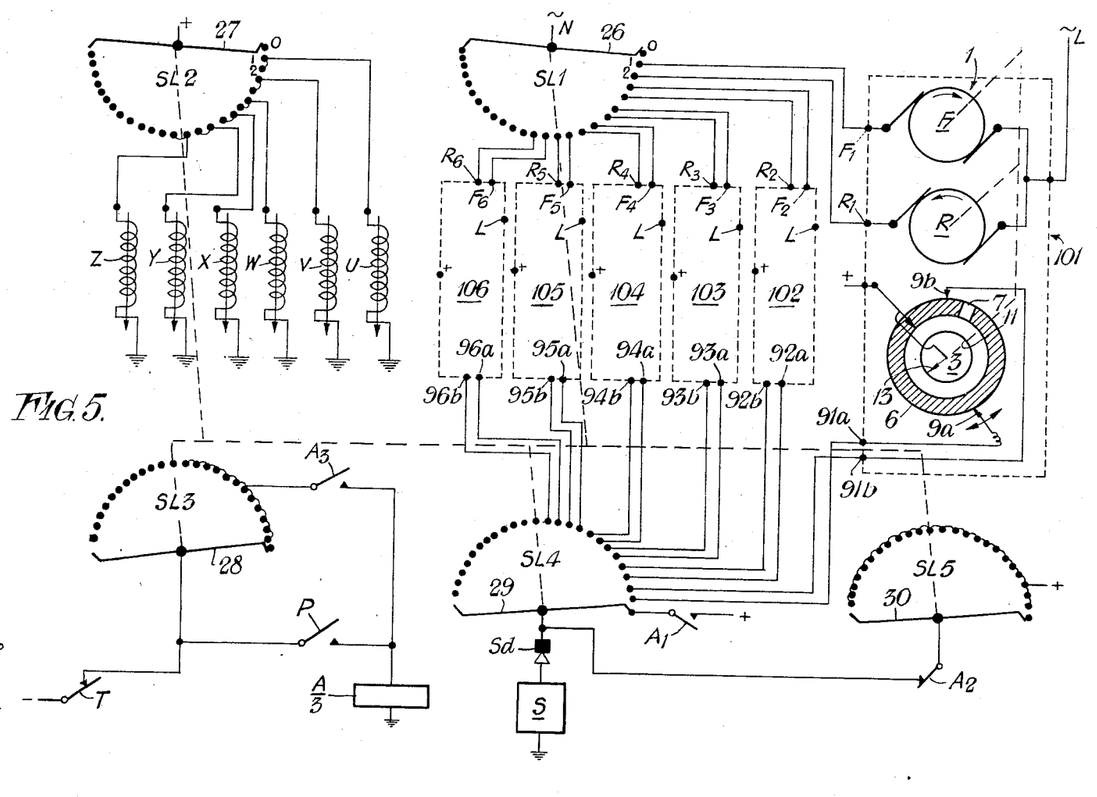
Fig. 5 illustrates an arrangement in which several timing units are sequentially operated to control sequential operations.

In the embodiment of the invention which is illustrated in Fig. 5 of the drawings, the timing of a sequence of events—represented by the several solenoids U, V, W, X, Y, Z—is controlled by a corresponding number of separate timing units which are arranged to be rendered operative in sequence. The units, of which only one is shown in detail, are referenced 101 . . . 106 respectively in the drawings, and each consist of a reversible synchronous motor such as that shown at 1 and at least one driven disc such as that shown at 3. It will be understood that the particular form of disc 3 in each case will be chosen to perform the desired operations of the respective timer. For convenience, it will be assumed that each disc 3 is of similar form to the one illustrated.

Each solenoid U, V . . . Z is energized through respective contacts on the second level SL2 of a uniselector S. The duration of energisation of each solenoid (i. e. the duration of the respective controlled event) is determined by the interval which elapses between successive steps of the uniselector S. This interval is controlled by each successive disc 3 in the timing units, the brushes in contact with which are connected to respective successive contacts on the fourth level SL4. The respective motors 1 in the timing units 101 . . . 106 are successively energized from the A. C. supply L, N through the contacts on the first level SL1, one contact being connected to a forward rotor F and the next succeeding contact to a reverse rotor R, and so on alternately throughout the operative part of the level. All the contacts on the fifth level SL5 except the zero contact are strapped and connected to the positive main, the wiper 30 being connected to the self-drive contacts *sd* through the initially closed contacts A₂ of a relay A/3.

The apparatus is started by means of a switch or push button P which is connected in series with the positive main through a normally closed switch or push button T for terminating an operation at will, and with the relay A/3, the other side of which is earthed. This relay is also connected, through hold-on contacts A₃, to a group of strapped contacts on the unisolector level SL3, there being as many strapped contacts (excluding the zero contact which is left on the open circuit), as there are operative contacts on the level SL1.

The apparatus operates as follows:

On closure of the push button P, the relay A/3 is energised to close its hold-on contacts A₃ and the contacts A₁, and to open the contacts A₂ in series with the wiper on the uniselector level SL5. Closure of the contacts A₁ connects the positive main through the zero contact on level SL4 to the self-drive contacts *sd* of the uniselector so that its magnet S is momentarily energised. This action steps the wipers on all levels round to their respective contacts No. 1. Engagement of the wiper on level SL3 with this contact connects the positive main through the hold-on contacts A₃ to the relay A/3, and the latter is accordingly locked in, permitting release of the push-button P. Simultaneously, the forward rotor F of the motor 1 in timing unit 101 is connected across the A. C. supply L, N, and the motor begins to run in the forward direction. At the same time, the solenoid U is energised through the wiper on level SL2, and the adjustable brush 9a on the disc 3 of the timing unit 101 is connected to the self-drive contacts *sd* through the wiper on level SL4.

As soon as the segment 7 reaches the brush 9a, the positive main is connected through the brush 13 and conducting inner ring 11 of the disc 3, segment 7, and brush 9a to the self-drive contacts sd, and the uniselector steps round one contact. When this occurs, the solenoid U remains energised through the second of the first pair of strapped contacts on level SL2, whilst the circuit of the forward rotor F is broken at level SL1 and the reverse rotor R is energised. The motor 1 thus reverses, and the disc 3 is driven in the opposite direction until the segment 7 engages the zero brush 9b.

At this point, the self-drive contacts sd again become energised through the wiper on level SL4, and the uniselector again steps round one contact. The solenoid U is thereupon de-energised at the level SL2 whilst the next solenoid V is energised through the first of the second pair of strapped contacts on this level. Simultaneously, the reverse rotor R of the motor 1 in the timing unit 101 is disconnected from the A. C. supply L, N, and the forward rotor of the motor in the second timing unit 102 is connected to the supply through the terminals L, F2. (The terminals F ... F6 of the timing units 102 ... 106 respectively correspond to the terminal F1 of the timing unit 101 which is connected to the forward rotor F, and the terminals R2 ... R6 similarly correspond to the terminal R1 of the reverse rotor R.) The same cycle of operations now takes place in respect of the timing unit 102 as took place in respect of the timing unit 101, the solenoid V becoming de-energised when the segment 7 on the disc 3 in the timing unit 102 reaches its zero-brush 9b and causes the uniselector to step round to its fifth position. The brushes 9a, 9b on this disc are connected to their respective contacts on level SL4 through the terminals 92a, 92b which correspond to the terminals 91a, 91b in the timing unit 101 and which are connected respectively to the brushes 9a, 9b thereof. The terminals 93a ... 96b have a corresponding significance.

When the uniselector reaches its fifth position, as described above, the solenoid W becomes energised and the cycles of operations continue until the last solenoid Z becomes de-energised. At this point, the wiper on the level SL3 moves off the last of the strapped contacts and breaks the hold-on circuit of the relay A/3 through its hold-on contacts A3. The relay A/3 is thus de-energised, and allows its normally closed contacts A2 to re-make. These contacts connect the positive main through the strapped contacts on the level SL5 and their co-operating wiper to the self-drive contacts sd, and the uniselector "homes" to its zero position. The original circuit conditions are thus restored in readiness for another operation.

If, at some point during the operation of the apparatus, it is desired to stop any further operation, the terminating switch or button T is opened, thus disconnecting the positive main from the wiper on level SL3 and de-energising the relay A/3. The uniselector then homes, as before, through its homing level SL5.

From the foregoing description, it will be seen that the duration of each event is under the separate control of an individual timing unit which can have a different speed of operation from the unit controlling the duration of another event. Thus, the same apparatus may be used to control a sequence of events having a very wide range of durations with a minimum of circuit complication. It is, of course, also possible for any timing unit 101 ... 106 to control more than one event simultaneously by making suitable circuit connections to the uniselector levels. For example, a sixth level may be provided to operate additional solenoids in unison with the solenoids U ... Z.

Figure 6:
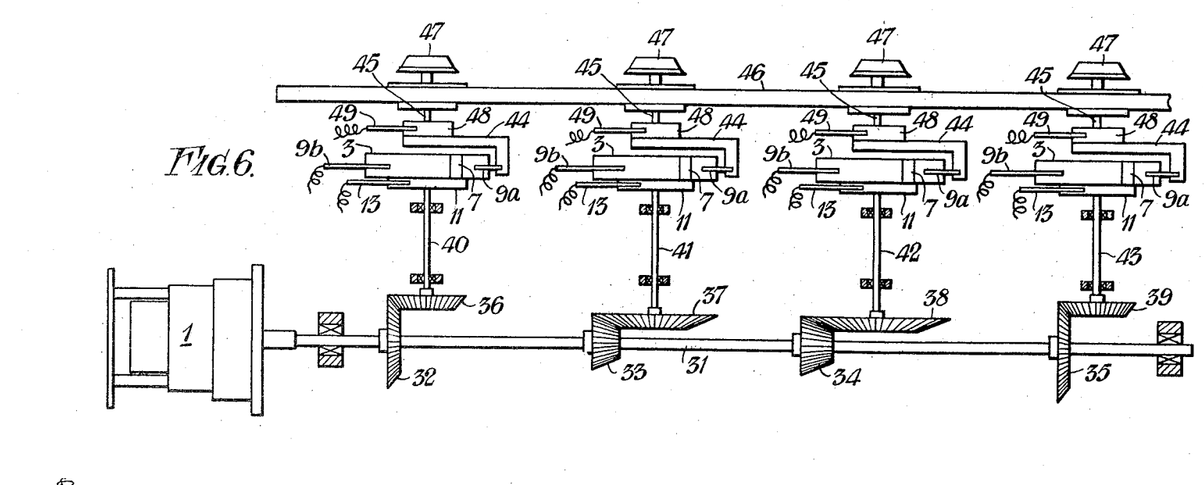
Fig. 6 is a schematic mechanical arrangement for deriving a plurality of different time periods from a single synchronous motor.

Fig. 6 shows an alternative arrangement of timing unit whereby different ranges of event duration may be derived from a single driving motor. In this arrangement, a single reversing synchronous motor 1 drives a main shaft 31 carrying a plurality (four are shown) of bevel gears 32, 33, 34, 35 of different sizes. Each bevel gear 32 ... meshes with a mating gear 36, 37, 38, 39 respectively which is keyed on a corresponding shaft 40, 41, 42, 43. The shafts each carry a disc 3 of a construction substantially identical with the disc 3 of earlier figures and having a conducting segment 7 which is electrically connected to a conducting slip ring 11. Current is fed to the slip ring by a brush 13, and adjustable and zero brushes 9a, 9b respectively co-operate with the periphery of the disc 3. The adjustable brush 9a is carried by an arm 44 which is rotatable on a spindle 45 separate from but coaxial with the shaft 40, 41, 42 or 43 as the case may be. This spindle 45 is mounted in bearings in a frame plate 46 of the timing unit and projects beyond it to carry an operating knob 47 for setting the brush 9a. The spindle 45 is mechanically and electrically secured to a slip ring 48 which is engaged by a brush 49 for connection to the controlled circuit. The knobs 47 may carry index marks to register with respective time scales engraved on the front face of the frame plate 46.

In operation, all the discs 3 are driven simultaneously by the single reversing synchronous motor 1, but rotate at different speeds due to the different ratios of the gearings 32, 33 ... 35, 39. By suitable selection of these ratios, a wide range of event durations may be accommodated by a single timing unit. If such a unit were to be used in the circuit of Fig. 5 replacing the separate timing units 101 ... 106, alternate contacts of the first level SL1 would be electrically grouped together, one group being connected to the forward rotor and the other to the reverse rotor of the motor 1. Periods of hours or even days can be timed if necessary.

Throughout the specification, electromagnetic relays may be either replaced by or controlled by thermionic gas discharge relays or hard values, as desired.

In all embodiments of the invention, the synchronous motor 1 may be replaced by a clockwork or other form of constant speed motor, and the segments 5, 7 on the discs 2, 3 respectively may be replaced by cam projections or other mechanical trip devices for controlling the increments of rotation of the said constant speed motor. The term "constant" is also to be construed in a broad sense in relation to the degree of accuracy required in the apparatus. The clockwork form of motor referred to above may, for example, be fitted with a mechanical governor to provide the desired degree of constancy of speed. Alternatively, an induction motor may be used in place of the synchronous motor.

What I claim is:

1. Control apparatus including a reversible constant speed motor and a pair of contacts electrically connected to said motor for controlling the direction of rotation thereof, and means for causing the opening and closing of said pair of contacts, said means comprising an electric circuit including a rotary contact disc operatively connected with said motor and driven thereby, said contact disc being provided with a periphery the major portion of which is formed of electrically non-conductive material and the remaining portion being formed of electrically conductive material, a plurality of contact brushes spaced about said contact disc in position engaging the periphery thereof, said brushes including a datum brush, a uniselector having a plurality of levels, a pair of electromagnetic relays operatively associated with said pair of contacts for causing the operation thereof to control the direction of rotation of said motor and the coil of one of said electromagnetic relays being connected to alternate contacts on one of said levels and the coil of the other of said electromagnetic relays being connected to the remaining contacts on said one level, a continuously energised wiper associated with said one level, and a further level having selected contacts each connected to one contact brush around the contact disc, other than the datum brush, a wiper associated with said further level and the wiper being electrically connected to one of said relays, an additional level having intermediate contacts electrically connected to the other relay and having a wiper associated therewith and electrically connected to the datum brush on the rotary contact disc and further means for stepping the uniselector one contact pitch on each operation of either electromagnetic relay, and a still further level having its contacts connected to electrical external event controlling apparatus, and a wiper associated with said still further level and connected in the positive main of said electric current.

2. Control apparatus including a reversible electric driving motor and a pair of contacts electrically connected to said motor for controlling the direction of rotation thereof, and means for causing the opening and closing of said pair of contacts, said means comprising an electric circuit including a rotary contact operatively connected with said motor and driven thereby, a plurality of cooperating contacts positioned about said rotary contact at predetermined spaced distances apart and engageable by said rotary contact, a pair of relays, one contact controlled by one relay and the other contact controlled by the other relay for causing the operation thereof to control the direction of rotation of said driving motor, a uniselector having a plurality of levels and a plurality of sets of contacts arranged at each level, one level of contacts connected to the windings of said relays and serving as hold-on contacts therefor, another level of contacts operable to connect one relay with said cooperating contacts in sequential order whereby the other relay is rendered operative when the next cooperating contact is made operative, and a still further level having its contacts connected to electrical external event controlling apparatus, and a wiper associated with said still further level and connected in the positive main of said electric circuit.

3. Control apparatus in accordance with claim 2 wherein a further level of contacts is provided which control the step-around mechanism of the uniselector on the energization of each cooperating contact, and a still further level of contacts serving to operate electrical control means for other apparatus.

References Cited in the file of this patent

UNITED STATES PATENTS

| | | |
|---|---|---|
| 1,141,154 | Tatum | June 1, 1915 |
| 1,458,902 | Dunn | June 12, 1923 |
| 1,950,692 | Owens | Mar. 13, 1934 |
| 1,968,398 | Irwin | July 31, 1934 |
| 2,053,143 | Frederick | Sept. 1, 1936 |
| 2,143,692 | Haar | Jan. 10, 1939 |
| 2,204,532 | Erbguth et al. | June 11, 1940 |
| 2,318,969 | Reynolds | May 11, 1943 |
| 2,416,166 | Farrow | Feb. 18, 1947 |
| 2,424,859 | Shoemaker | July 29, 1947 |